(12) United States Patent
Feher (10) Patent No.: US 8,282,836 B2
(45) Date of Patent: *Oct. 9, 2012

(54) WATER INTAKE STRUCTURE

(75) Inventor: Peter Feher, Suwanee, GA (US)

(73) Assignee: C-Water Technologies, Inc., Evergreen, CO (US)

( * ) Notice: Subject to any disclaimer, the term of this patent is extended or adjusted under 35 U.S.C. 154(b) by 293 days.

This patent is subject to a terminal disclaimer.

(21) Appl. No.: 12/707,463

(22) Filed: Feb. 17, 2010

(65) Prior Publication Data

US 2010/0224570 A1    Sep. 9, 2010

Related U.S. Application Data

(60) Provisional application No. 61/153,095, filed on Feb. 17, 2009.

(51) Int. Cl.
 *E02B 5/08* (2006.01)
 *E02B 8/08* (2006.01)
(52) U.S. Cl. ............... 210/747.5; 210/159; 210/162; 210/170.1; 405/83; 405/127
(58) Field of Classification Search ............ 210/747.5, 210/159, 162, 170.09, 170.1, 170.11, 499; 405/81, 83, 108, 127; 119/219
See application file for complete search history.

(56) References Cited

U.S. PATENT DOCUMENTS

| | | |
|---|---|---|
| 345,773 A | 7/1886 | Crane |
| 426,988 A | 4/1890 | Crocker |
| 870,138 A | 11/1907 | King et al. |
| 1,115,393 A | 10/1914 | Caswell |
| 1,150,445 A | 8/1915 | Matheson |
| 1,254,602 A | 1/1918 | Kafader |
| 1,265,251 A | 5/1918 | Rush |
| 1,269,779 A | 6/1918 | Bell |
| 1,429,629 A | 9/1922 | Randlett |
| 1,708,817 A | 4/1929 | Winger |
| 1,810,981 A | 6/1931 | Noble |
| 2,673,451 A | 3/1954 | Gariel |
| 3,820,342 A | 6/1974 | Stipanov |
| 3,868,324 A | 2/1975 | Taylor et al. |
| 3,996,138 A | 12/1976 | Daidola et al. |
| 4,064,048 A | 12/1977 | Downs et al. |

(Continued)

OTHER PUBLICATIONS

Coutant et al., "Induced Sweeping Flows at CWIS for Reducing Fish Impingement," Environmental Sciences Division, Oak Ridge, TN, presented at: Symposium on Cooling Water Intake Technologies to Protect Aquatic Organisms, Arlington, VA, May 2003, 18 pages.

(Continued)

*Primary Examiner* — Christopher Upton
(74) *Attorney, Agent, or Firm* — Sheridan Ross P.C.

(57) ABSTRACT

Water intake structures for power plants and other industrial facilities may include an inflow channel, a deep well, an outflow channel, and an intake channel These structures may include a fish screen, such as a wedge-wire screen or the like, positioned between the deep well and the intake channel to separate fish, fish larvae and fish eggs from water supplied to the intake channel from the deep well. These structures may further include one or more circulating or sweep flow pumps positioned proximate an outlet of the outflow channel. The sweep flow pumps may be used to maintain a sweep flow through the deep well of the intake structure to help sweep fish, fish larvae and fish eggs away from the fish screen and into the outflow channel.

30 Claims, 7 Drawing Sheets

U.S. PATENT DOCUMENTS

| | | | |
|---|---|---|---|
| 4,337,008 A | 6/1982 | Kulyabko et al. | |
| 4,360,427 A | 11/1982 | Posgate | |
| 4,415,462 A | 11/1983 | Finch et al. | |
| 4,481,904 A | 11/1984 | Fletcher | |
| 4,488,835 A | 12/1984 | Eicher | |
| 4,526,494 A * | 7/1985 | Eicher | 210/162 |
| 4,921,599 A | 5/1990 | Botsch | |
| 5,277,799 A | 1/1994 | Bransch | |
| 5,385,428 A | 1/1995 | Taft, 3rd et al. | |
| 5,653,874 A | 8/1997 | Berry, III | |
| 5,791,291 A | 8/1998 | Strong et al. | |
| 6,051,131 A | 4/2000 | Maxson | |
| 6,089,790 A | 7/2000 | Berry, III et al. | |
| 6,102,619 A * | 8/2000 | Truebe et al. | 405/81 |
| 6,357,389 B1 | 3/2002 | March et al. | |
| 6,451,204 B1 | 9/2002 | Anderson | |
| 6,467,997 B2 * | 10/2002 | Johnson | 405/81 |
| 6,524,028 B2 | 2/2003 | Bryan | |
| 6,843,924 B2 | 1/2005 | Dreyer et al. | |
| 6,964,541 B2 | 11/2005 | Bryan | |
| 7,118,307 B2 | 10/2006 | Stoecker et al. | |
| 7,410,324 B2 | 8/2008 | Tucker | |
| 7,594,779 B2 | 9/2009 | Hildstad et al. | |
| 2003/0021632 A1 * | 1/2003 | Nestler | 405/81 |
| 2003/0072617 A1 | 4/2003 | Burns, II | |
| 2003/0131801 A1 * | 7/2003 | Nestler et al. | 119/219 |
| 2006/0236950 A1 | 10/2006 | Patrick et al. | |
| 2007/0175834 A1 | 8/2007 | Osborne et al. | |
| 2008/0101867 A1 | 5/2008 | McLaughlin | |
| 2008/0213045 A1 | 9/2008 | Tappel | |
| 2009/0317191 A1 | 12/2009 | Jang et al. | |
| 2011/0146802 A1 * | 6/2011 | Feher | 137/1 |

OTHER PUBLICATIONS

Author Unknown, "A.C.I.D. Fish Passage Improvement Project: Fish Screen—The Site Takes Shape," A.C.I.D. Fish Passage in operation in the United States at least as early as May 2001, 8 pages.

* cited by examiner

WATER INTAKE STRUCTURE

CROSS-REFERENCE TO RELATED APPLICATIONS

This application claims, under 35 U.S.C. §119(e), the benefit of U.S. provisional application No. 61/153,095, entitled "Water Intake Structure" and filed on Feb. 17, 2009, the entire disclosure of which is hereby incorporated by reference herein in its entirety.

FIELD OF INVENTION

The present invention generally relates to water intake structures, and more particularly to water intake structures for power plants and other industrial facilities.

BACKGROUND

Power plants and other industrial facilities, such as desalination plants, often require large amounts of cooling or other process related water. The required water may be obtained from a large water source, such as an ocean, lake or river. Some of the cooling systems are referred to as once-through cooling systems since the warmed up cooling water is returned to the natural body of water after one pass through the cooling system. Often there is a water intake structure constructed near the plant to allow water to be provided to the plant from the water source. These intake structures typically must have screens or some other type of filtering system to significantly reduce the number of fish, fish larvae and fish eggs contained within the water pumped through the plant. Because the size of fish larvae and eggs is relatively small, it is often difficult to economically design a screen or other filter system with sufficiently small openings to prevent entrapment of the fish larvae and eggs, or, in other words, to prevent aqueous organisms from flowing through the cooling system of the plant. Further, if the velocity of water flow through the filter is too large, fish may become impinged onto the surface of the screen. The survival rate of impinged and entrapped fish is very low. Accordingly, what is needed in the art is an improved intake structure that provides an economical solution to efficiently reduce the impingement and entrapment of fish, fish larvae and fish eggs for water intakes of power and other large industrial plants.

SUMMARY OF THE INVENTION

One embodiment of the invention may take the form of a water intake structure. The water intake structure may include an inflow channel, an outflow channel, an intake channel, a deep well, a fish screen, one or more circulating or sweep flow pumps, and one or more intake pumps. The intake pumps may also be referred to as primary pumps as they deliver the water to the primary process. The inflow channel may include an inlet in fluid communication with a water source and an outlet. The outflow channel may include an inlet and an outlet in fluid communication with the water source. The intake channel may include an inlet and an outlet. The deep well may be in fluid communication with the outlet of the inflow channel, the inlet of the outflow channel, and the inlet of the intake channel. The fish screen may be positioned between the deep well and the inlet of the intake channel. The one or more circulating or sweep flow pumps may be positioned within the outlet channel and configure to provide a sweep flow through the deep well. The one or more intake pumps may be positioned on the intake side of the screen.

Another embodiment of the invention may take the form of a method of operating a water intake structure. The method may include supplying a deep well with a fluid from a fluid source via an inflow channel, and creating a sweep flow through the deep well from the inflow channel to an outflow channel. The method may further include supplying from the deep well an intake flow to an intake channel with the intake flow supplied from the deep well to the intake channel through a screen positioned between the deep well and the intake channel. The method may yet further include supplying the sweep flow from the deep well to the fluid source via the outflow channel, and supplying the intake flow to a served process via the intake channel.

DETAILED DESCRIPTION

Described herein are water intake structures for power plants and other industrial facilities. These water intake structures may include an inflow channel, a deep well, an outflow channel, and an intake channel. These structures may further include a trash screen positioned proximate the inflow channel for screening trash and large debris from water drawn from the water source into the inflow channel. These structures may also include a fish screen, such as a wedge-wire or wedge-bar screen or the like, positioned between the deep well and the intake channel to separate fish, fish larvae and fish eggs from water drawn from the deep well into the intake channel. These structures may yet further include one or more circulating or sweep flow pumps positioned proximate the outflow channel. These circulating or sweep flow pumps may be used to maintain a sweep flow through the deep well of the intake structure to help sweep fish, fish larvae and fish eggs away from the fish screen and into the outflow channel from the deep well.

Figure 1:
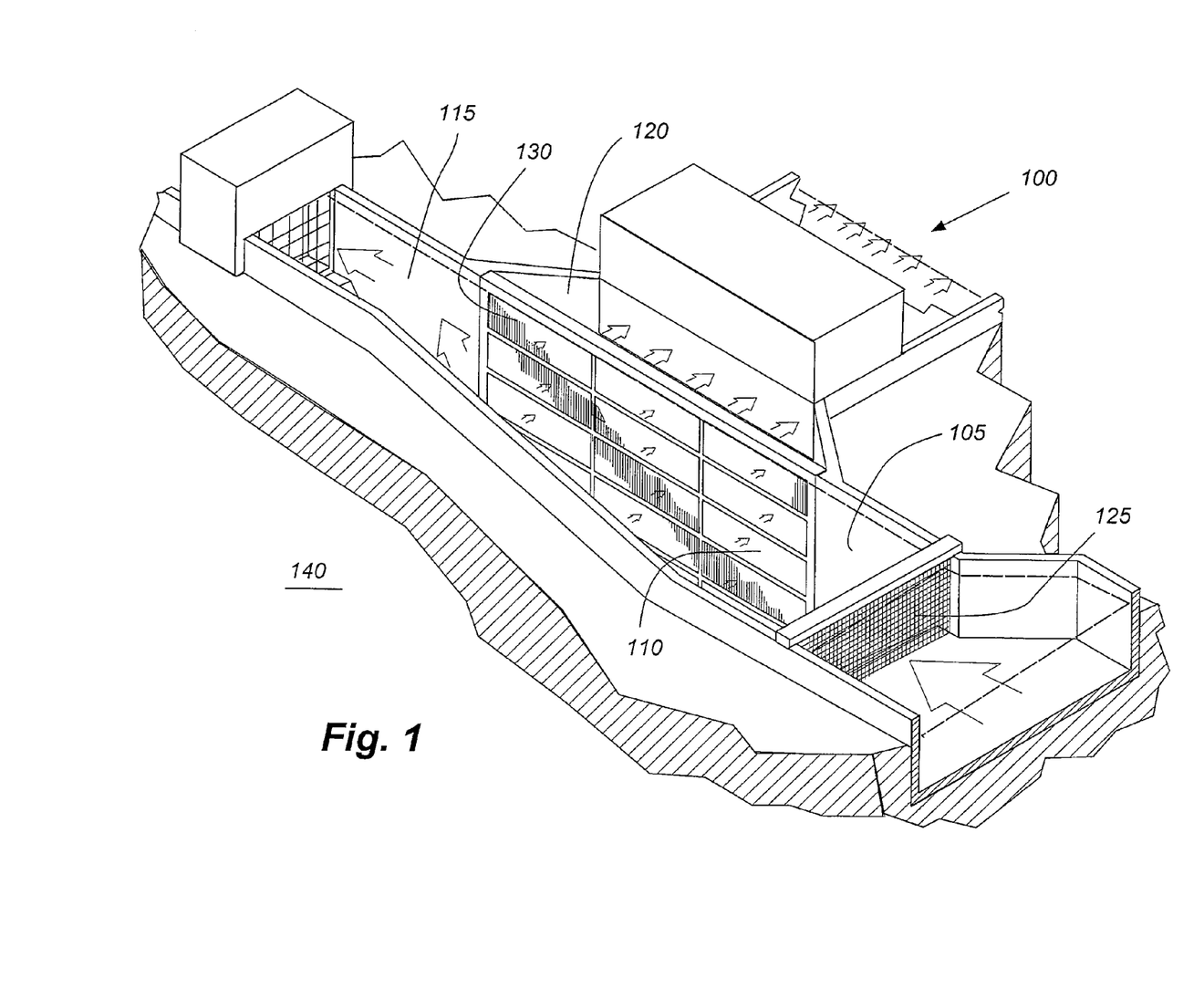
FIG. 1 shows a perspective view of a water intake structure.
Figure 2:
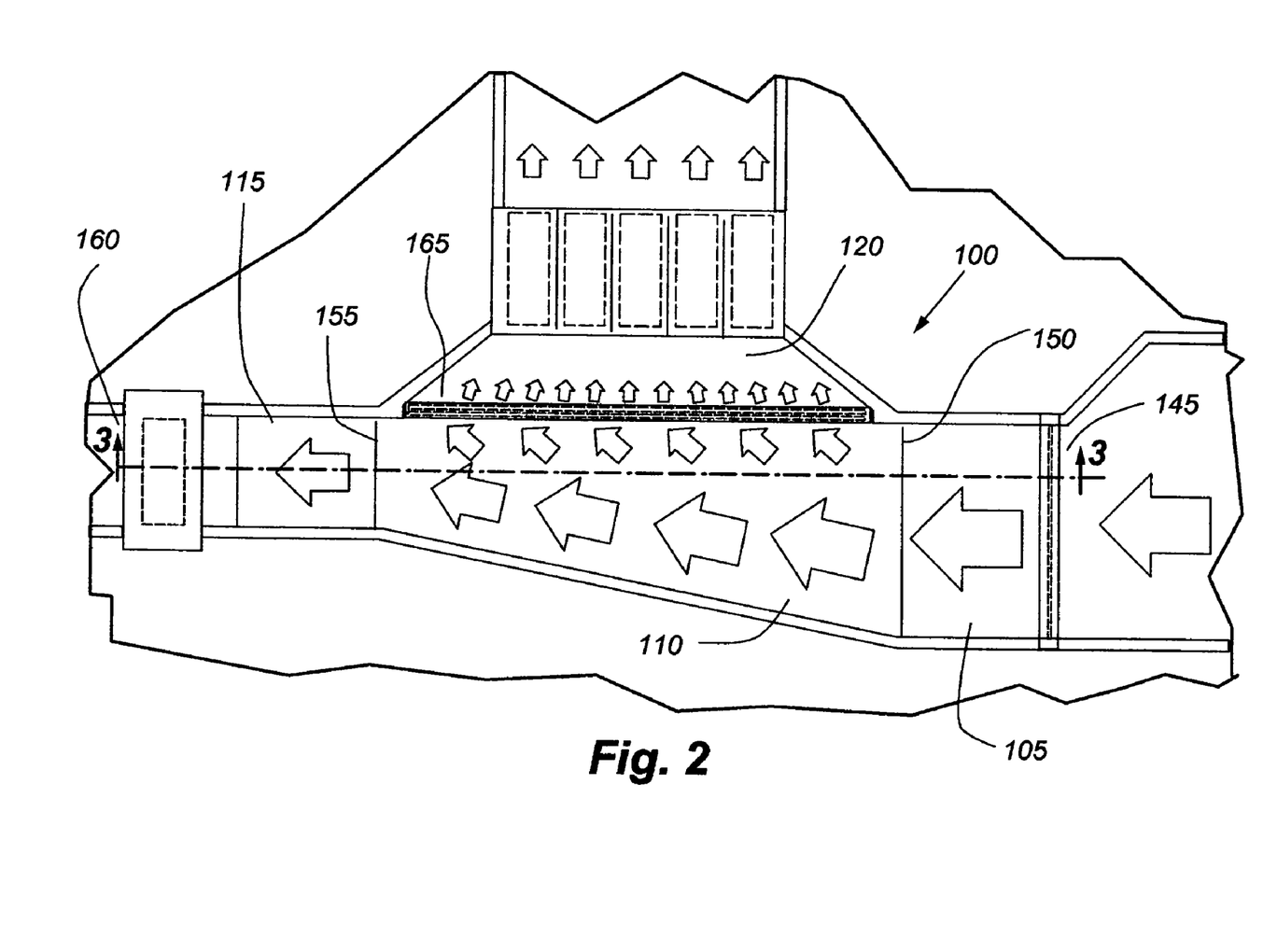
FIG. 2 shows a plan view of the water intake structure of FIG. 1.
Figure 3:
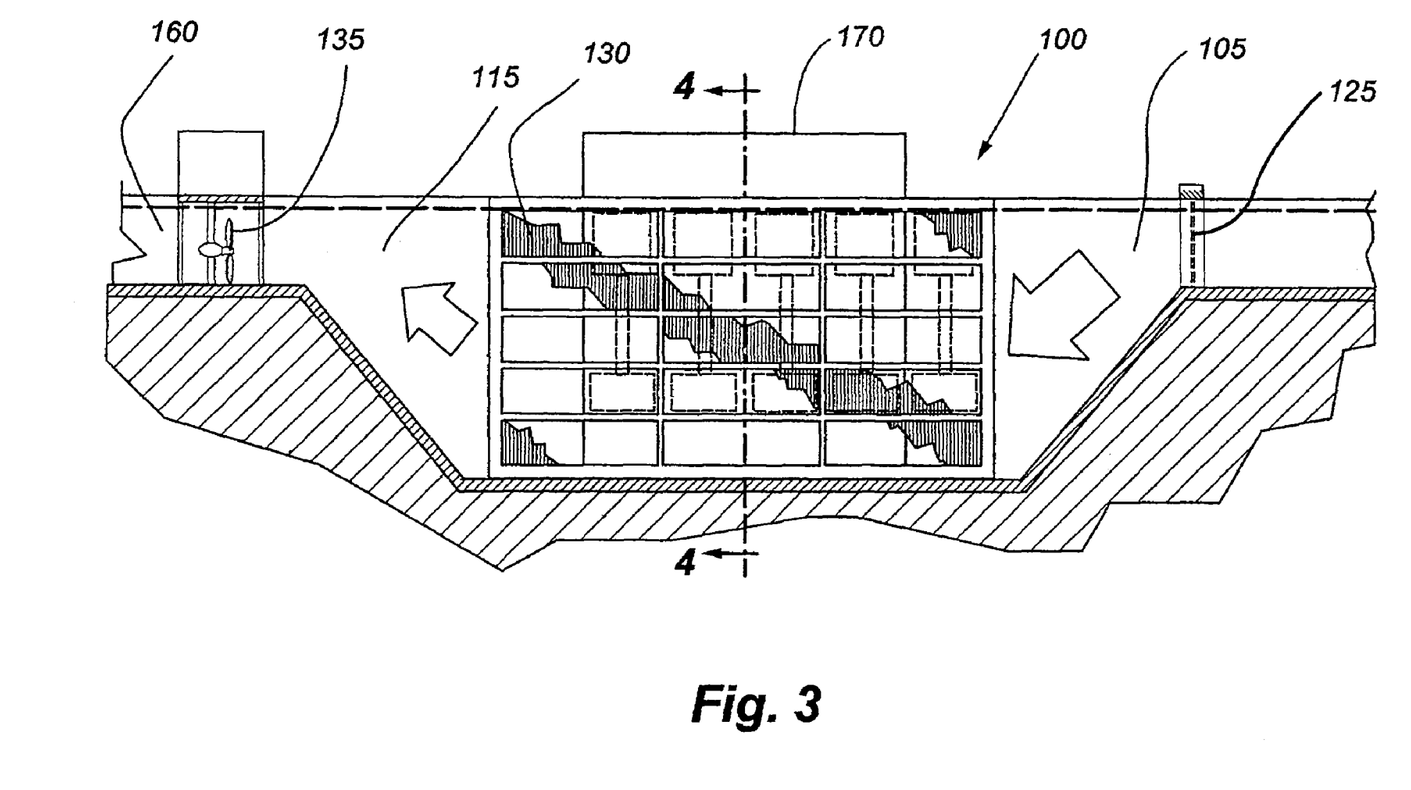
FIG. 3 shows a cross-section view of the water intake structure of FIG. 1, viewed along section 3-3 in FIG. 2.
Figure 4:
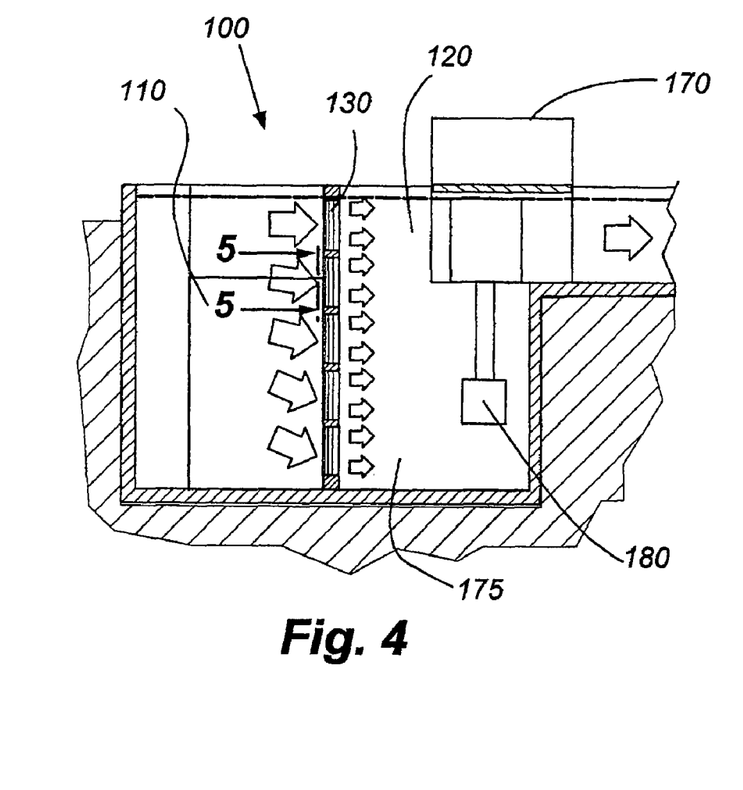
FIG. 4 shows a cross-section view of the water intake structure of FIG. 1, viewed along section 4-4 in FIG. 3.

FIG. 1 shows a perspective view of a water intake structure 100, FIG. 2 shows a plan view of the water intake structure 100, FIG. 3 shows a cross-section view of the water intake structure 100, and FIG. 4 shows another cross-section view of the water intake structure 100. With reference to these figures, the water intake structure 100 may include an inflow channel 105, a deep well (or channel) 110, an outflow channel 115, and an intake channel 120. The intake structure 100 may further include a trash screen 125 positioned proximate the inflow channel 105, and a fish screen 130 positioned between the deep well 110 and the intake channel 120. The intake structure 100 may further include one or more circulating or sweep flow pumps 135 positioned proximate the outflow channel 115.

The inflow channel 105 may be in fluid communication with a water source 140, such as an ocean, a lake or a river, via an inflow channel inlet 145. The inflow channel 105 may further be in fluid communication with the deep well 110 via an inflow channel outlet 150. As shown, for example, in FIG. 2, the width of the inflow channel 105 may remain substantially constant along the length of the inflow channel 105. With particular reference FIG. 3, the depth of the inflow channel 105 may remain substantially constant for a portion of the length of the inflow channel 105 when moving towards the inflow channel outlet 150 from the inflow channel inlet 145 and then may gradually increase in depth until the depth of the inflow channel 105 proximate the deep well 110 is approximately the same as the depth of the deep well 110. Because the depth of the inflow channel 105 increases as it approaches the deep well 110 while the width remains substantially the same, the flow of water through the inflow channel 105 will slow down as the water approaches the deep well 110. Further, while FIG. 3 illustrates the change in depth as being substantially, linear, the change in depth could be non-linear or some combination of linear and non-linear With continued reference to FIGS. 2 and 3, the depth of the deep well 110 remains substantially constant along the length of the deep well 110 from the inflow channel 105 to the outflow channel 115. The width of the deep well 110, however, gradually decreases along the length of the deep well 110 from the inflow channel 105 to the outflow channel 115. This decrease in the width helps to maintain the velocity of the water flow through the deep well 110 from the inflow channel 105 to the outflow channel 115. More particularly, water is withdrawn from the deep well 110 into the intake channel 120 along the length of the deep well 110. Thus, in order to maintain the velocity of the remaining water that flows in the deep well 110 from the inflow channel 105 to the outflow channel 115, either the width or the depth of the deep well 110 must be decreased. Since the depth of the deep well 110 remains constant, decreasing the width of the deep well 110 along its length from the inflow channel 105 to the outflow channel 115 allows the velocity of the water flowing in the deep well 110 from the inflow channel 105 to the outflow channel 115 to remain substantially the same.

Still referring to FIGS. 2 and 3, the outflow channel 115 may be positioned at an end of the deep well 110 opposite the end of the deep well 110 joined to the inflow channel 105. The outflow channel 115 may be in fluid communication with the deep 110 well via an outflow channel inlet 155. The outflow channel 115 may further be in fluid communication with the water source 140 via an outflow channel outlet 160. The width of the outflow channel 115 may remain substantially constant along the length of the outflow channel 115. The depth of the outflow channel 115 may gradually decrease along a portion of the length of the outflow channel 115 from the outflow channel inlet 155 to the outflow channel outlet 160. After the outflow channel 115 reaches a desired or pre-determined depth along its length, the depth of the outflow channel 115 may remain substantially constant along the remaining length of the outflow channel 115 to the outflow channel outlet 160. Decreasing the depth of the outflow channel 115 along a portion of its length while maintaining the width along its length causes the velocity of the water flowing within the outflow channel 115 to increase as the water flows from the deep well 110 to the water source 140 until the depth of the outflow channel 115 ceases to decrease. Similar to the inflow channel 105, the outflow channel's 115 depth may decrease linearly, non-linearly, or some combination thereof.

The intake channel 120 may be positioned proximate the deep well 110 along a side of the deep well 110 that extends from the inflow channel outlet 150 to the outflow channel inlet 155. The intake channel 120 may be in fluid communication with the deep well 110 via an intake channel inlet 165. The intake channel 120 may further be in fluid communication with an intake pump house 170 via an intake channel outlet area 175. The pump house 170 may contain one or more intake pumps 180, such as vertical turbine pumps, that withdraw water from the intake channel 120 for delivery to a power plant or other facility. The intake pumps 180 may be in fluid communication with other or more pipes, tunnels, channels or other fluid conveyance systems that allow the fluid to be moved from the pump house 170 to the power plant or other facility. Although five intake pumps 180 are shown in FIGS. 2 and 3, the number of intake pumps 180 used in the system may be more or less than five pumps.

With particular reference to FIG. 4, the depth of the intake channel 120 is approximately the same as the depth of the deep well 110. Further, the depth of the intake channel 120 remains substantially constant from the intake channel inlet 165 to the intake channel outlet area 175. Referring to FIG. 2, the width of the intake channel 120, however, decreases along the length of the intake channel 120 from the intake channel inlet 165 to the intake channel outlet area 175. This decrease in the width results in an increase in the velocity of the water as it flows in the intake channel 120 from the deep well 110 to the pump house 170.

Returning to FIGS. 1 and 2, the trash screen 125 may be positioned proximate the inflow channel inlet 145. The trash screen 125 may extend across the width of the inflow channel 105 from an upper portion of the inflow channel 105 to the bottom of the inflow channel 105. The trash screen 125 separates coarse trash and other larger debris from water flowing into the inflow channel 105 from the water source 140. The trash screen 125 may be a stationary bar or a bar screen with trash rake car construction for coarse screening.

With reference to FIGS. 1-4, the fish screen 130 may be positioned between the deep well 110 and the intake channel 120. The fish screen 130 extends along the width of the intake channel 120 from an upper portion of the intake channel 120 to the bottom of the intake channel 120. The fish screen 130 helps to separate fish, fish larvae, and fish eggs from water flowing into the intake channel 120 from the deep well 110. The fish screen 130 may take the form of a wedge-wire or wedge-bar screen or the like.

Figure 5:
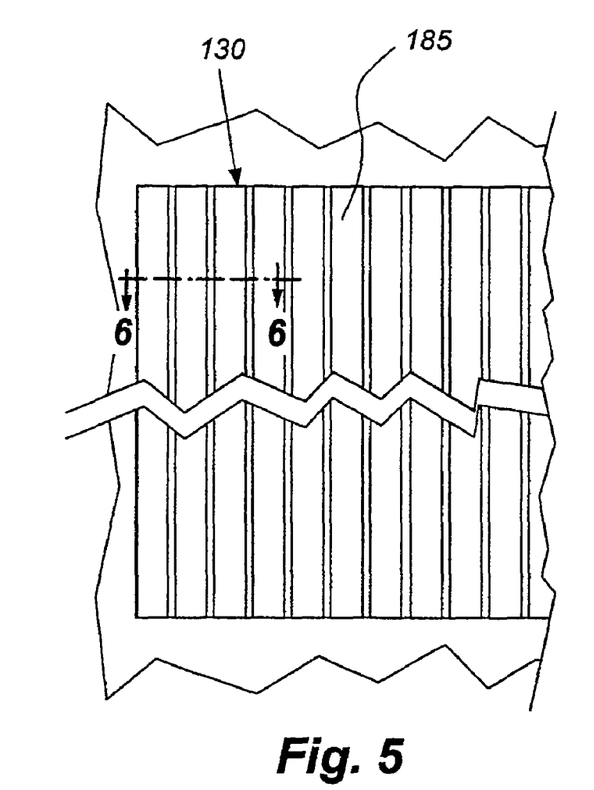
FIG. 5 shows an elevation view of a portion of a fish screen for the water intake structure of FIG. 1.
Figure 6:
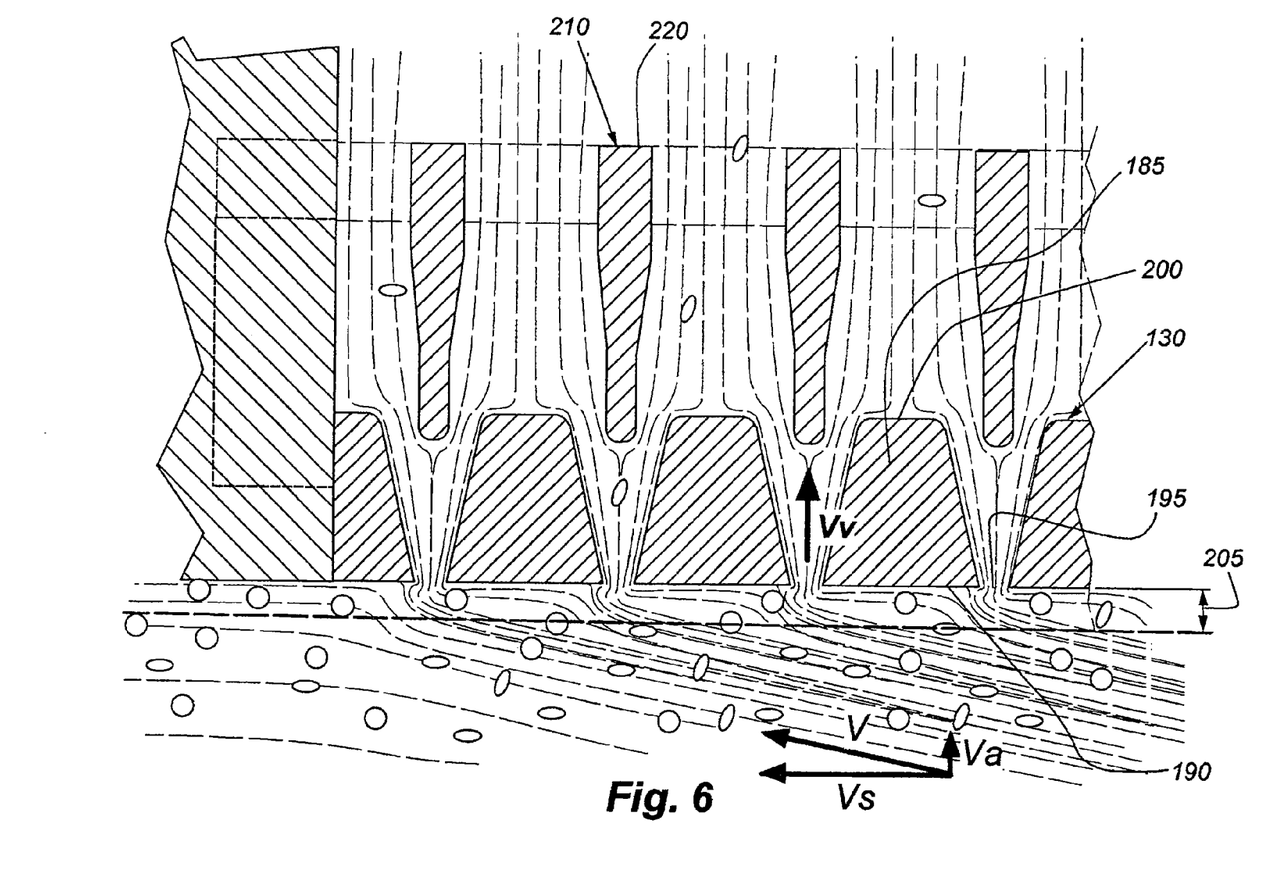
FIG. 6 shows a cross-section view of a portion of the water intake structure of FIG. 1, viewed along section 6-6 in FIG. 5 and showing a portion of the fish screen and screen cleaning blades.
Figure 7:
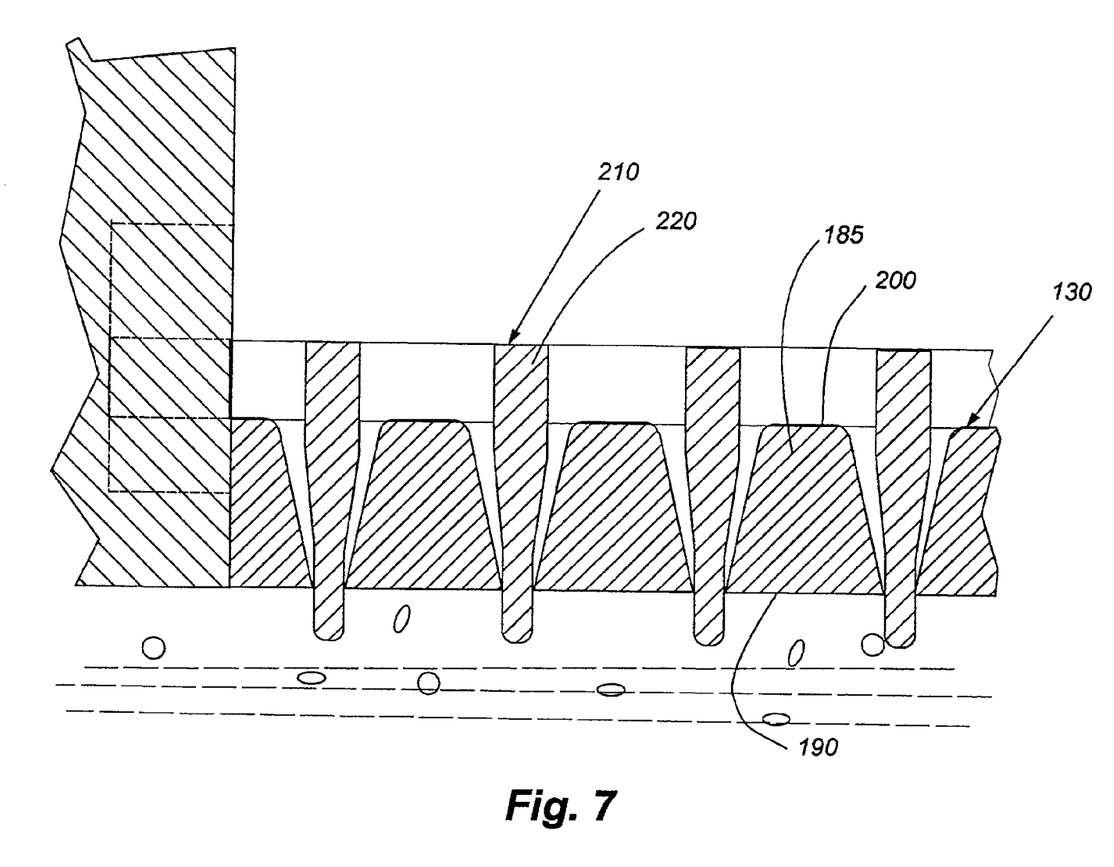
FIG. 7 shows a cross-section view of a portion of the water intake structure of FIG. 1 similar to the view shown in FIG. 6 with the screen cleaning blades shown in an operational position.

FIG. 5 shows an elevation view of a portion of the fish screen 130, and FIGS. 6 and 7 show cross-section views of a portion of the fish screen 130. With reference to these figures, the fish screen 130 may take the form of a wedge-wire screen. The wedge-wire screen may be formed from multiple wedge or trapezoidal shaped bars 185 or heavy gauge wires that extend from an upper portion of the intake channel 120 to the bottom of the intake channel 120. Each bar 185 may be spaced apart from an adjacent bar 185 to define on the deep well side 190 of the bar 185 a gap 195 between the bars 185. The gaps 195 defined between adjacent bars 185 allow water to flow from the deep well 110 to the intake channel 120 through the fish screen 130.

The width of each bar 185 proximate its deep well side 190 is approximately 5 to 8 times larger than the gap 195 defined between adjacent bars 185. For example, if the width of the bar 185 is approximately ⅜", the gap 195 between adjacent bars 185 may range from approximately 3/40" to 3/64". The foregoing example is merely illustrative and is not intended to imply a specific size for the widths of the bars 185 on the deep well side 190 of the bars 185 or a specific size for the gaps 195 defined between adjacent bars.

With reference to FIG. 6, the width of the bars 185 decreases from the deep well side 190 to the intake channel side 200 of the bars 185. This decrease in width results in an increase in the size of the opening defined between adjacent bars from the deep well side to the intake channel side of the bars. For example, the width of the bars on the deep well side of bars is approximately ⅜", the width of the bars on the intake channel side of the bars may be approximately 2/8". Continuing with this example, the opening between the bars may then increase approximately ⅛" from the deep well side to the intake channel side of the bars. The foregoing example is merely illustrative and is not intended to imply or require specific widths at the deep well side and intake channel side of the bars.

A narrow gap 195 between the bars 185 increases the face or approach velocity of the fluid flow transverse (perpendicular) to the fish screen's face plane as the fluid approaches and passes through the fish screen 130. This increase in fluid velocity transverse to the fish screen's 130 face-plane helps to separate fish larvae and eggs from the water passing through the fish screen 130 by an inertia-separation phenomenon.

More particularly, as shown schematically in FIG. 6, as water approaches the fish screen 130, it approaches at a relatively sharp or acute angle relative to the face-plane of the fish screen 130. This angle may be approximately ten degrees or less. Thus, in terms of relative magnitude, the velocity of the water flow parallel to the face of the fish screen 130, identified as Vs in FIG. 6, is substantially larger than the velocity of water flow transverse to the face of the fish screen 130, identified as Va in FIG. 6. The velocity of water flow parallel to the face of the fish screen 130 may be referred to as the sweep velocity for convenience, and the velocity of the water flow transverse to the face of the fish screen 130 may be referred to as the approach velocity for convenience.

Because the sweep velocity is relatively large compared to the approach velocity, fish larvae and eggs carried in the fluid are primarily moving parallel to the face of the fish screen 130. As the fluid approaches and passes through the gaps 195 in the fish screen 130, the approach velocity begins to increase until it reaches its pass-through velocity, which is identified in FIG. 6 as Vv. This acceleration in flow in the direction transverse to the face of the fish screen 130 tends to separate the fish larvae and eggs from the portion of the water passing through the fish screen 130 because the mass of the fish larvae and eggs tends to keep them moving in a direction parallel to the fish screen 130 as the portion of the water in the deep well 110 passing through the fish screen 130 accelerates through the fish screen 130.

This area of localized acceleration of the fluid proximate to the face of the fish screen 130 in the direction transverse to the face plane of the fish screen 130 may be defined as a boundary layer of entrainment 205. Fish eggs and larvae that do not enter this zone (i.e., the boundary layer of entrainment 205) will generally be swept through the deep well 110 and back into the water source 140 via the outflow channel 115. Similarly, the majority of fish larvae and eggs that enter this zone will also be swept through the deep well 110 and back into the water source 140 via the outflow channel 115 because of their separation from the water flowing through the fish screen 130 as described above. As shown schematically in FIG. 6, however, some small portion of the fish larvae and eggs that enter the boundary layer of entrainment 205 will pass through the fish screen 130 since the gaps 195 in the fish screen 130 are generally not small enough to stop all fish larvae and eggs from passing through the fish screen 130.

As the boundary layer of entrainment 205 increases, the overall percentage of fish eggs and larvae passing through the fish screen 130 will increase. The one or more circulating or sweep flow pumps 135 may be used to control the size of the boundary layer of entrainment 205. More particularly, as the pump speed of the one or more circulating or sweep flow pumps 135 is increased, the sweep velocity of the fluid in the deep well 110 will increase and the size of the boundary layer of entrainment 205 will decrease. If the pump speed of the one or more circulating or sweep flow pumps 135 is decreased, the sweep velocity of the fluid in the deep well 110 will decrease and the size of the boundary layer of entrainment 205 will increase.

With reference to FIGS. 6 and 7, the water intake structure 100 may further include a fish screen cleaning system 210. The fish screen cleaning system 210 may include multiple elongated blades 220 aligned with the openings in the fish screen 130. The blades 220 may be joined to a rack or other suitable support structure. To clean the fish screen 130, the blades 220 may be moved from a non-engagement or initial position, as shown in FIG. 6, to a position where at least a portion of the each blade 220 is received through a corresponding gap 195. As a portion of a blade 220 is received through a corresponding gap 195 in the fish screen 130, any debris or other material that may be covering a portion of the gap 195 is dislodged from the fish screen 130. The dislodged material may then be swept by the flow of the water in the deep well 110 out of the deep well 110 and into the water source 140 via the outflow channel 115.

Figure 8:
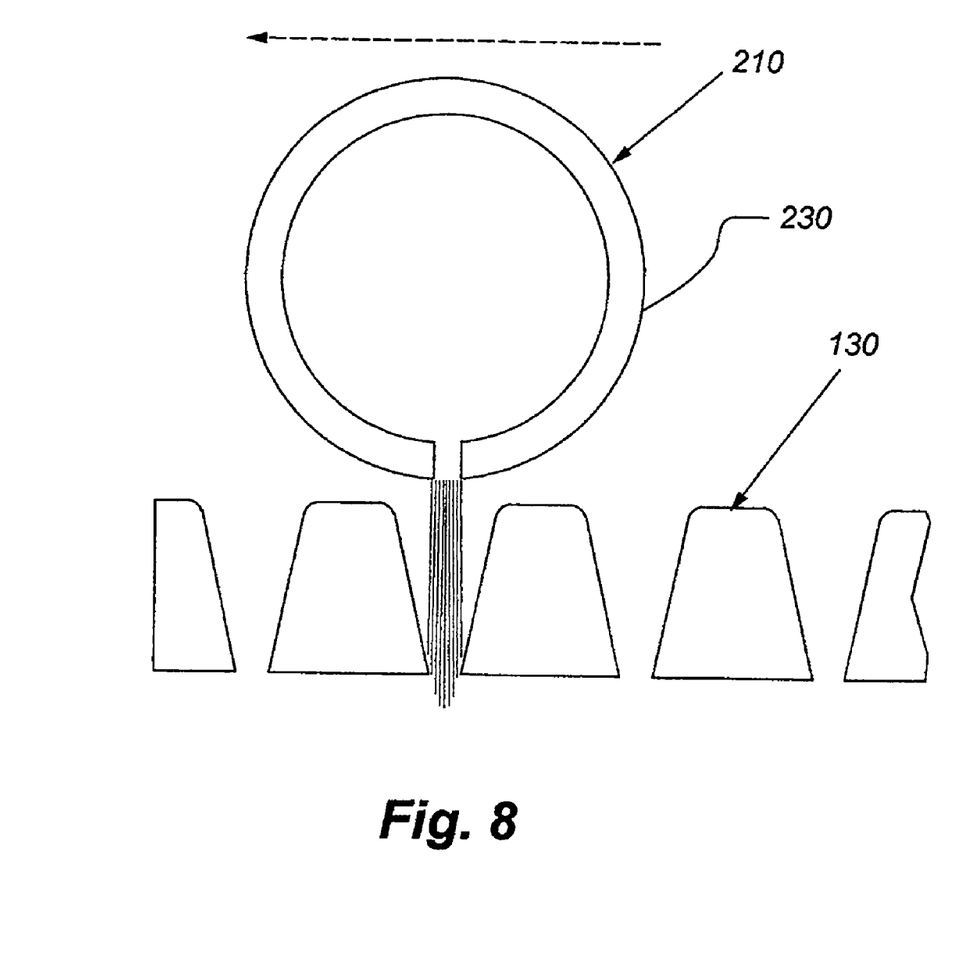
FIG. 8 shows a cross-view of a portion of the water intake structure of FIG. 1 similar to the view shown in FIG. 6 showing another version of a cleaning system for the fish screen.

FIG. 8 shows a schematic of another version of a fish screen cleaning system 210. In this version, the fish screen 130 may be cleaned using high pressure cleaning jets. More particularly, one or more high pressure water nozzles 230 may be positioned proximate the fish screen 130. The high pressure water nozzles 230 may be configured to impact a portion of the fish screen 130 with one or more high pressure water jets that dislodge debris and other material from that portion of the fish screen 130. The dislodged material may then be swept by the flow of the water in the deep well 110 out of the deep well 110 and into the water source 140 via the outflow channel 115. The high pressure water nozzles 230 may be moved along the fish screen 130 to clean the entire fish screen 130.

Returning to FIGS. 1-3, the one or more circulating or sweep flow pumps 135 may be positioned proximate the outflow channel outlet 160 of the outflow channel 115. The circulating or sweep flow pumps 135 may be slow speed axial circulator pumps or any other type of fish friendly pumps. The circulating or sweep flow pumps 135 allow fish, fish larvae and fish eggs to pass through the sweep pumps 135, thus allowing the fish, fish larvae and fish eggs that enter the fluid intake structure 100 to return to the water source 140 unharmed. Although one circulating or sweep flow pump 135 is shown in FIGS. 2 and 3, more than one circulating or sweep flow pump 135 may be used.

The size of the deep well 110, the inflow channel 105, the outflow channel 115, and the intake channel 120 may be a function of the amount of water required for the power or industrial plant or other industrial facility, the available space to build the structure, and the absolute upper limit for the approach velocity of the fluid. With respect to the approach velocity of the fluid, generally this must be below a certain pre-determined absolute value to limit the potential for fish to become impinged against the fish screen 130. In some water intake structures, the upper limit for the approach velocity is approximately 0.5 ft/s. Similarly, the required size for the one or more circulating or sweep flow pumps 135 may be a function of the minimum required sweep flow velocity. Generally, the ratio of the sweep flow velocity to the approach velocity should be no less than approximately 3:1, and generally may be between approximately 3:1 to 12:1. It is generally desirable to keep the ratio as small as possible to minimize the energy required to operate the sweep flow pumps 135. The ratio, however, should be maintained at a level that keeps the number of fish, fish larvae, and fish eggs that pass through the fish screen 130 at an acceptable level.

The sweep flow pump 135 may have a variable flow control mechanism, such as variable speed control, to control the sweep flow velocity. Likewise, the intake pump 180 may a variable flow control mechanism, such as variable speed, to adjust to the changing requirements of the process. The variable flow control mechanisms for the sweep flow pump 135 and the intake pump 180 may be used, either individually or in combination, to modulate or adjust the ratio of sweep flow to the intake flow or the ratio of sweep velocity to approach velocity. For example, if the intake pump 180 speed is increased to deliver more intake or primary flow water to the served process or decreased to deliver less intake or primary flow water to the served process, thus resulting in an increase or decrease, respectively, in the approach velocity, the speed of the sweep flow pump 135 may be increased or decreased, respectively, to maintain the ratio of the sweep flow velocity to the approach velocity. As another example, it may be desirable to increase the ratio of the sweep flow velocity to the approach velocity by increasing the speed of the sweep flow pump 135 and/or decreasing the speed of the intake pump 180, if it is determined that an unacceptable number of fish, fish larvae and eggs are passing through the fish screen. As yet another example, it may be desirable, by changing the speed of the sweep flow pump 135 and/or the intake pump 180, to adjust the ratio of the sweep flow velocity to the approach velocity to account for seasonal fluctuations in the number of fish passing through the water intake structure 100, with larger ratios being used during periods when large numbers of fish, fish larvae or fish eggs are present within in the water intake structure 100 and smaller ratios being used during periods when less fish, fish larvae or fish eggs are present within the water intake structure 100.

In one embodiment of the water intake structure 100, the deep well 110 may have a depth of approximately fifty feet. In this embodiment, the width of the intake channel 120 proximate the deep well 110 may be approximately 120 feet and the width of the intake channel 120 proximate the intake pump house 170 may range from approximately 70 to 100 feet. In this embodiment, the sweep flow pump 135 may have a diameter of approximately 10 to 12 feet. The foregoing dimensions are merely illustrative of some potential dimensions of the water intake structure 100 and are not intended to imply or require particular dimensions for any components of the water intake structure 100.

With reference to FIGS. 1-4, the water intake structure 100 may include walls and a base to define the deep well 110, the inflow channel 105, the outflow channel 115 and the intake channel 120. The walls and the base may be formed using suitable material for forming a channel or a well, including, but not limited to, concrete, reinforced concrete or the like. In some embodiments, the water intake structure 100 may be formed using a prefabricated double wall steel structure built in a shipyard as a floating vessel or barge. After floating the structure to the location of the water intake structure, the hollow space between the double walls may be filled with concrete to gradually lower the structure in place to the lake or sea bed.

In operation, water flows from the water source 140 into the inflow channel 105 through the trash screen 125. The trash screen 125 separates coarse trash and other large debris from the water as it flows through the trash screen 125. From the inflow channel 105, the water flows to the deep well 110. In the deep well 110, a portion of the water flows to the outflow channel 115 and a portion of the water flows to the intake channel 120. For convenience, the portion of water that flows to the outflow channel 115 may be referred to as the sweep flow and the portion of water that flows to the intake channel 120 may be referred to as the intake flow. Of the total water entering the deep well 110, the sweep flow may be approximately 50 to 70 percent of the total water and the intake flow may be approximately 30 to 50 percent of the total water.

The intake flow passes from the deep well 110 to the intake channel 120 through the fish screen 130. As the water approaches the fish screen 130, the portion passing through the fish screen 130 (i.e., the intake flow) increases in velocity as it passes through the fish screen 130. This increase in velocity helps to separate fish larvae and eggs from the intake flow. The sweep flow may then carry the separated fish larvae and eggs out of the deep well 110 and into the outflow channel 115. From the outflow channel 115, the sweep flow, fish, fish larvae and fish eggs pass through one or more circulating or sweep flow pumps 135 and return to the water source 140. From the intake channel 120, the intake flow is drawn though the intake pumps 180 and delivered to a location for use in a served process, such as being delivered to a power plant or other industrial facility for use as cooling water.

While controlling the velocity of water flow through the various components of the water intake structure 100 (i.e., the inflow channel 105, the outflow channel 115, the deep well 110, and the intake channel 120) has been described by holding one dimension constant (e.g., width or depth) and varying the other dimension of the component, either dimension could be maintained as constant with the other dimension varied or both dimensions could be varied. For example, in some embodiments, the depth of the deep well 110 could be suitably varied rather than remain constant and the width could remain constant rather than be varied in order to maintain the velocity of the sweep flow through the deep well from the inflow channel to the outflow channel. As another example, in some embodiments, both the depth and the width of the deep well may be suitably varied to maintain the velocity of the sweep flow through the deep well from the inflow channel to the outflow channel.

While the screening, separation and sweeping function for the water intake structure has been described in connection with delivering water to a process plant or the like, the water intake structure or modified versions thereof may be used in other open channel fluid systems that require separation of particles or other matter from a fluid flowing through the structure.

All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A water intake structure, comprising:
    an inflow channel including an inlet in fluid communication with a water source and an outlet;
    an outflow channel including an inlet and an outlet in fluid communication with the water source;
    an intake channel including an inlet and an outlet;
    a deep well in fluid communication with the outlet of the inflow channel, the inlet of the outflow channel, and the inlet of the intake channel;
    a screen positioned between the deep well and the inlet of the intake channel; and
    at least one first pump positioned within the outflow channel and configured to provide a sweeping flow through the deep well.

2. The structure of claim 1, wherein the at least one first pump is positioned proximate the outlet of the outflow channel.

3. The structure of claim 1, wherein the screen comprises at least one of a wedge-wire screen or a wedge-bar screen.

4. The structure of claim 3, wherein the screen includes a plurality of bars and adjacent bars define gaps within the screen.

5. The structure of claim 4, wherein a ratio of at least one of the gaps to a width of one of the plurality of bars defining the gap is between approximately 1:5 and 1:8.

6. The structure of claim 1, wherein the width of the deep well decreases from the outlet of the inflow channel to the inlet of the outflow channel.

7. The structure of claim 1, wherein the outlet of the intake channel is in fluid communication with at least one second pump configured to deliver water from the intake channel to a served process.

8. The structure of claim 7, wherein the at least one first pump and the at least one second pump are configured to be operated in such a manner that a ratio of a sweep velocity to an approach velocity of fluid flowing in the deep well is no less than approximately 3 to 1.

9. The structure of claim 7, wherein a ratio of a sweep velocity to an approach velocity of fluid flowing in the deep well is varied by changing the speed of at least one of the at least first pump or the at least one second pump.

10. The structure of claim 1, wherein the at least one first pump comprises a variable speed pump configured in such a manner that a substantially constant ratio of a sweep velocity to an approach velocity of fluid flowing in the deep well can be maintained.

11. The structure of claim 1, further comprising a plurality of blades positioned proximate the screen to clean the screen.

12. The structure of claim 1, further comprising at least one high pressure water nozzle positioned proximate the screen to clean at least a portion of the screen.

13. The structure of claim 12, wherein the at least one high pressure water nozzle may be moved relative to the screen to clean different sections of the screen.

14. The structure of claim 1, wherein the outlet of the inflow channel is positioned at a first end of the deep well the inlet of the outflow channel is positioned at a second end of the deep well distal the first end, and the inlet of the intake channel is positioned between the first and second ends of the deep well.

15. A method of operating a water intake structure, comprising:
    supplying a deep well with a fluid from a fluid source via an inflow channel;
    creating a sweep flow through the deep well from the inflow channel to an outflow channel;
    supplying from the deep well an intake flow to an intake channel, the intake flow supplied from the deep well to the intake channel through a screen positioned between the deep well and the intake channel;
    supplying the sweep flow from the deep well to the outflow channel; and
    supplying the intake flow to a served process via the intake channel.

16. The method of claim 15, wherein a ratio of a velocity of the sweep flow to an approach velocity of an intake flow is no less than approximately 3:1.

17. The method of claim 15, further comprising using at least one pump positioned within the outflow channel to create the sweep flow within the deep well.

18. A water intake structure comprising:
    an inflow channel in fluid communication with a water source;
    a deep well in fluid communication with the inflow channel;
    an outflow channel in fluid communication with the deep well;
    a screen positioned adjacent the deep well, the screen comprising at least one of a wedge-wire screen or a wedge-bar screen;
    a pump positioned within the intake structure and configured to provide a sweep flow of fluid through the deep well; and
    wherein the screen includes a plurality of bars and gaps located between the bars, and further wherein the ratio of at least one gap to a width of at least one bar adjacent the gap is between approximately 1:5 and 1:8.

19. The water intake structure of claim 18, wherein:
    a width of the deep well decreases from an outlet of the inflow channel to an inlet of the outflow channel.

20. The water intake structure of claim 18, wherein:
    the pump includes at least two pumps configured to be operated to provide the sweep flow.

21. The water intake structure of claim 20, wherein:
    a first pump of said at least two pumps is configured to be operated so that a sweep velocity to an approach velocity of fluid flowing through the intake structure is no less than approximately 3:1.

22. The water intake structure of claim 18, further comprising:
    a plurality of blades positioned proximate the screen to clean the screen.

23. The water intake structure of claim 18, further comprising:
   at least one high pressure water nozzle positioned proximate the screen to clean at least a portion of the screen.

24. A method of operating a water intake structure comprising:
   supplying a water intake structure having inflow channel, an outflow channel, and a deep well positioned between the inflow and outflow channels;
   supplying fluid to flow through the inflow channel into the deep well, and out through the outflow channel;
   providing a screen positioned adjacent the deep well and oriented substantially perpendicular to flow of fluid through the intake structure as defined by a sweep flow flowing through the deep well;
   supplying the sweep flow to contact the screen; and
   generating an intake flow through the intake structure wherein a ratio of a velocity of the sweep flow to an approach velocity of the intake flow is no less than approximately 3:1.

25. The method of claim 24, further comprising:
   using at least one pump positioned within the intake structure to create the sweep flow.

26. The method of claim 24, wherein:
   the sweep velocity and the approach velocity is adjusted to enable separation of fish, fish larvae and fish eggs such that a majority of these are maintained within the sweep flow, and a pass through velocity is generated for the intake flow enabling fluid to flow through the screen in which a sufficient pass through velocity is created by an acceleration of the fluid as it flows through the screen.

27. The method of claim 24, wherein:
   the fish, fish larvae and eggs move in a direction substantially parallel to the fish screen, and the fluid making up the intake flow moves in a direction substantially perpendicular to the fish screen.

28. The method of claim 24, wherein:
   an area of localized acceleration of the fluid proximate to a face of the screen in a direction transverse to a plane of the screen comprising a portion of the intake flow is defined as a boundary layer of entrainment, in which a majority of the fish, fish larvae and eggs that enter the boundary layer of entrainment are swept through the boundary layer to the deep well and not through the screen.

29. A method of separating fish, fish larvae, and eggs from a fluid flow passing through a screen, said method comprising:
   providing a screen positioned along a sweep flow of fluid;
   providing the fish, fish larvae and eggs in the sweep flow;
   providing the screen with a plurality of bars and gaps between the bars wherein a ratio of at least one gap to a width of one of the plurality of bars is approximately 1:5 to 1:8 and;
   generating an intake flow through the screen, wherein a ratio of a velocity of the sweep flow to an approach velocity of the intake flow is no less than approximately 3:1.

30. The method of claim 29, wherein:
   a pass through velocity is generated for the intake flow enabling the fluid to pass through the screen, and acceleration occurs sufficient for the intake flow to reach the pass through velocity.

* * * * *